Patented July 23, 1935

2,008,674

UNITED STATES PATENT OFFICE 2,008,674

PROCESS FOR PRODUCING LOW COLD TEST OIL

Allan Berne-Allen, Jr., Woodbury, N. J., assignor to Standard Oil Development Company, a corporation of Delaware No Drawing. Application February 16, 1932, Serial No. 593,415

15 Claims. (Cl. 196—19)

The present invention relates to the art of separating wax from oils containing the same, and more specifically to improvements in the art of separating wax-oil mixtures by means of centrifugal force at low temperatures. My process will be fully understood from the following description:

In the removal of wax from oil, cold pressing is ordinarily used where possible, but if the wax is amorphous or jelly-like, this process is not applicable and other means are necessary. Of these the known ones include cold settling and cold centrifuging. The oil mixture is diluted with naphtha or other suitable diluents and is cooled at a suitable rate varying with the stock and diluent used. The mixture is cooled to a point 20 to 45° below the desired pour point of the finished oil and the separation, whether by centrifugal or simple settling means, is accomplished at that temperature. As diluents naphtha, or lighter hydrocarbons, acetone and other ketones, esters or mixtures of all of these substances with each other may be used. These non-viscous diluents tend to mix freely with the oil but at low temperatures have very little solvent power for waxes. The amount of solvent varies somewhat with different oils and with different solvents, but in general a proportion above about 60 parts of solvent to 40 parts of the waxy oil is considered necessary.

I have found that certain substances, which I would designate as separation aids, even when in small proportions exert a particularly desirable effect on the separation of wax from oil by cold settling or cold centrifuging. These substances which will be fully described below enable one to greatly reduce the proportion of diluent to the waxy oil and thereby greatly increase the capacity of a given centrifuge as based on the undiluted, waxy oil. Furthermore, the presence of these said substances brings about a cleaner separation, that is, produces oil of a lower pour point and better grade petrolatum. In many cases oils which cannot be centrifuged in an efficient manner may be so treated after the addition of these substances. Larger yields of oil are generally observed, and better grades of petrolatum produced when separation aids are used. It will be understood that these substances are used in small amounts in conjunction with the usual diluents.

The separation aids which I add to waxy oils are generally polymerized, or condensed substances produced from active wax derivatives. By "active" wax derivatives I mean the halides such as a chloride made by bubbling chlorine through molten wax for 10 to 20 hours or more, so as to produce a wax containing 10 to 15% of chlorine. The other halides may, of course, be used also. I likewise include among the "active" derivatives the olefins derived from waxes; by splitting off hydrochloric acid from the wax halide, or obtained directly from the wax by dehydrogenation, preferably in the known manner, which is capable of producing the least possible rupturing of carbon to carbon bonds.

These active derivatives are then polymerized or condensed with aromatic hydrocarbons such as naphthalene at low temperatures, for example, below 160 or 200° F. and preferably at temperatures within the range of 70 to 120° F. Polymerization is preferably conducted in the presence of aluminum chloride, but its well-known equivalents such as zinc chloride, boron fluoride and other aluminum halides may be used. Other types of separation aids which are unpolymerized may be used such as aluminum stearate, magnesium, cobalt, zinc and similar salts of the acids obtained by known processes of oxidizing paraffin wax and oils.

The amount of the separation aid varies somewhat with different oils. It is generally used in proportion less than 2½% and may be used generally within the range from $\frac{1}{10}$ to 1½% in most cases. Simple tests will easily determine the most satisfactory amount to be used on any given oil.

As representative samples of the type of material used in my process the following inspections may be considered:

|  | Sample I | Sample II |
|---|---|---|
| Gravity | 23.4 A. P. I. | 29.8 A. P. I. |
| Viscosity at 100° F | 8,500 secs. Saybolt. | 3,000 secs. Saybolt. |
| Viscosity at 210° F | 312 secs. Saybolt. | 235 secs. Saybolt. |
| Pour | 65° F | 80° F. |

The first of these samples was made by the condensation of chlorparaffin and naphthalene through the agency of aluminum chloride and at a low temperature of about 100° F. The second substance was produced in a similar manner except that no naphthalene was used.

As examples of the operations of my process the following are given:

1. A distillate of Panhandle crude has the following inspection:

Gravity _____ 27.3 A. P. I.
Flash _____ 470° F.
Vis. at 210° F _____ 62.8 secs. Saybolt
Pour _____ 115° F.

This oil is diluted with naphtha in proportion of 81% naphtha and 19% heavy oil. It is then chilled at a rate of 2° to 4° F. per hour to about −50° F. and centrifuged, but only with great difficulty and the separation is definitely unsatisfactory.

Another sample of the identical oil is treated with 1% of a substance substantially identical with that given above as Sample I. It is diluted with naphtha in proportion of 75% of the naphtha and 25% of heavy oil and is then chilled in the same manner to −50° F. and centrifuged at that temperature with great ease. The oil recovered has a pour point of −5° F., the petrolatum is of good grade and the yields are good.

2. In another case an oil is diluted in proportion of 82% of naphtha and 18% heavy waxy oil. This is chilled and centrifuged in the normal way. A second sample of the same oil to which 1% of a separation aid has been added is diluted to produce a mixture of 65% naphtha and 35% of the heavy oil. This sample is chilled in the usual way and centrifuged with ease. In absence of the separation aid it is found that a mixture containing less than the 82% of naphtha cannot be readily centrifuged, but in the case where the separation aid is present the centrifuge has substantially the same capacity for diluted oil as in the case of the mixture diluted to 82%. It will be noted, therefore, that in the latter case when the separation aid is present, the capacity of the centrifuge for the waxy oil is considerably greater than in its absence.

3. When using a mixture of propane and butane as the diluent it is found in one case that a ratio of diluent to waxy oil of 87:13 gives the best results, but by addition of ½% of the separation aid it is possible to cut the ratio to 80:20. Other improvements are noted also; the pour point of the oil recovered in the latter case is −10° F. as against 0° F. in the former case, although the separation operations were conducted at the same temperature, and the petrolatum lost in the first case is 12.8 against 14% in the latter.

4. An oil of the following inspection (25 parts) is diluted with 75 parts of naphtha

| | |
|---|---|
| Gravity A. P. I. | 28.4 |
| Flash | 485° F. |
| Viscosity at 210° F. | 59.8 secs. Saybolt |
| Pour | 120° F. |

A second sample is diluted in the same way and 2% of a condensation product of chlorparaffin and naphthalene is added. Both samples are cooled to −30° F. and allowed to stand for settling. The first sample solidified into a jelly-like mass which showed no sign of separating after standing 20 or more hours. The second sample settled relatively rapidly into two layers, the solid occupying 39.8% of the mass. The clear liquor was decanted, naphtha was distilled off and the oil showed the following inspection:

| | |
|---|---|
| Gravity | 25.7 A. P. I. |
| Flash | 485° F. |
| Vis. at 210° F. | 69.7 secs. Saybolt |
| Vis. at 100° F. | 703 secs. Saybolt |
| Pour point | −5° F. |

My invention is not to be limited by any theory of the mechanism by which separation aids operate, nor to any specific diluent or separation aid, or method of separation, but only to the claims in which I wish to claim all novelty inherent in the process.

I claim:

1. An improved process for removing waxy constituents from hydrocarbon oils containing same which comprises adding thereto a small quantity of a separation aid of the class produced by polymerization of "active" derivatives of waxy hydrocarbons prepared by a dehydrogenation of the waxy hydrocarbons in which the original carbon structure of the waxy hydrocarbons is essentially preserved, chilling the mixture to below the wax separation point and removing the wax so caused to separate.

2. Process according to claim 1 in which the polymerization product is obtained by reacting the "active" derivatives of waxy hydrocarbons at low temperature in the presence of a catalyst of the type of aluminum chloride.

3. Process according to claim 1 in which a non-viscous hydrocarbon diluent is used during the separation step.

4. An improved process for removing waxy constituents from hydrocarbon oils containing the same comprising adding thereto a small quantity of a separation aid of the class produced by low temperature aluminum chloride condensation of a chlorinated waxy hydrocarbon and an aromatic hydrocarbon, chilling the mixture to below the wax separation point and removing the wax so caused to separate.

5. Process according to claim 1 in which the separation is effected in the presence of a non-viscous diluent by centrifugal force.

6. Process according to claim 1 in which separation is effected in the presence of a non-viscous diluent by simple settling.

7. An improved process for removing waxy material of the type difficult to press or centrifuge from heavy hydrocarbon oils which comprises diluting the oil and adding thereto a small quantity of a separation agent of the class of low temperature aluminum chloride condensation products of "active" derivatives of waxy hydrocarbons prepared by a dehydrogenation of the waxy hydrocarbons in which the original carbon structure of the waxy hydrocarbons is essentially preserved, chilling to a suitable wax separation point and removing the precipitated wax by centrifugal force.

8. An improved process for removing waxy material of the type difficult to press or centrifuge from heavy hydrocarbon oils which comprises diluting the oil and adding thereto a small quantity of a separation aid of the class of low temperature aluminum chloride condensation products of "active" derivatives of waxy hydrocarbons with aromatic hydrocarbons, chilling to a suitable wax separation point and removing precipitated wax by centrifugal force.

9. An improved process for separating oil-wax mixtures which comprises diluting the mixture and adding thereto a small quantity of a separation aid of the class of low temperature aluminum chloride condensation products of active derivatives of waxy hydrocarbons prepared by a dehydrogenation of the waxy hydrocarbons in which the original carbon structure of the waxy hydrocarbons is essentially preserved, chilling the mixture to a suitable wax separation point and removing the separated wax by cold settling.

10. An improved process for separating oil-wax mixtures which comprises diluting the mixture and adding thereto a small quantity of a separation aid of the class of low temperature aluminum chloride condensation products of "active" derivatives of waxy hydrocarbons with aromatic hydrocarbons, chilling to a suitable wax separation point and removing the separated wax by cold settling.

11. An improved process for separating oil-wax mixtures which comprises adding to the mixture a small quantity of a synthetic polymer of an active derivative of a waxy hydrocarbon prepared by a dehydrogenation of the waxy hydrocarbon in which the original carbon structure of the waxy hydrocarbon is essentially preserved, chilling the mixture to cause wax to separate and removing the wax from the oil.

12. A process according to claim 8, in which the polymer is a product of the reaction of a waxy hydrocarbon, chlorinated to the extent of 10 to 15%, with naphthalene.

13. Process according to claim 10, in which the polymer is a product of the reaction of a waxy hydrocarbon, chlorinated to the extent of 10 to 15%, with naphthalene.

14. Process according to claim 1 in which a diluent comprising a liquefied normally gaseous hydrocarbon is used.

15. Process according to claim 1 in which a diluent comprising a hydrocarbon selected from the class of propane and butane is used.

ALLAN BERNE-ALLEN, JR.